(12) United States Patent
Yu

(10) Patent No.: US 7,365,681 B2
(45) Date of Patent: Apr. 29, 2008

(54) GPS RECEIVER HAVING A PRESCRIBED TIME-OF-ENTRY INTO AN OPERATION MODE

(75) Inventor: Yiming Yu, Cupertino, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 284 days.

(21) Appl. No.: 11/229,949

(22) Filed: Sep. 19, 2005

(65) Prior Publication Data

US 2007/0063890 A1    Mar. 22, 2007

(51) Int. Cl.
*G01S 5/14* (2006.01)
(52) U.S. Cl. ............. 342/357.15; 342/357.02; 342/357.06
(58) Field of Classification Search ......... 342/357.02, 342/357.06, 357.15
See application file for complete search history.

(56) References Cited

U.S. PATENT DOCUMENTS

| | | | |
|---|---|---|---|
| 5,594,453 A | 1/1997 | Rodal et al. | |
| 5,663,735 A | 9/1997 | Eschenbach | |
| 5,798,732 A | 8/1998 | Eschenbach | |
| 5,847,680 A | 12/1998 | McBurney | |
| 5,854,605 A | 12/1998 | Gildea | |
| 6,191,731 B1 | 2/2001 | McBurney et al. | |
| 6,211,817 B1 | 4/2001 | Eschenbach | |
| 6,225,945 B1 | 5/2001 | Loomis | |
| 6,295,023 B1 | 9/2001 | Bloebaum | |
| 6,346,911 B1* | 2/2002 | King | 342/357.06 |
| 6,546,040 B1 | 4/2003 | Eschenbach | |
| 6,725,157 B1 | 4/2004 | Yu | |
| 6,731,701 B2 | 5/2004 | Vorobiev et al. | |
| 6,898,234 B1 | 5/2005 | Yu et al. | |

* cited by examiner

*Primary Examiner*—Thomas H. Tarcza
*Assistant Examiner*—Fred H. Mull
(74) *Attorney, Agent, or Firm*—Menlo Patent Agency LLC

(57) ABSTRACT

A GPS receiver having a fast method for determining GPS clock time. The GPS receiver includes a signal processor for receiving GPS signals from GPS satellites and detecting current GPS data bits carried by the respective GPS signals, a chapter memory for storing a block of expected GPS data bits for the respective GPS satellites, and a GPS time detector for detecting a successful match when a chunk of the expected data bits within a selected search range within the block matches a chunk of the current data bits, and using the successful match for determining the GPS clock time. In an anytime embodiment the GPS receiver enters an operation mode at any time in order to minimize user request latency. In a focused embodiment the GPS receiver enters the operation mode at a prescribed time-of-entry in order to minimize power consumption for cycles of standby and operation modes.

24 Claims, 10 Drawing Sheets

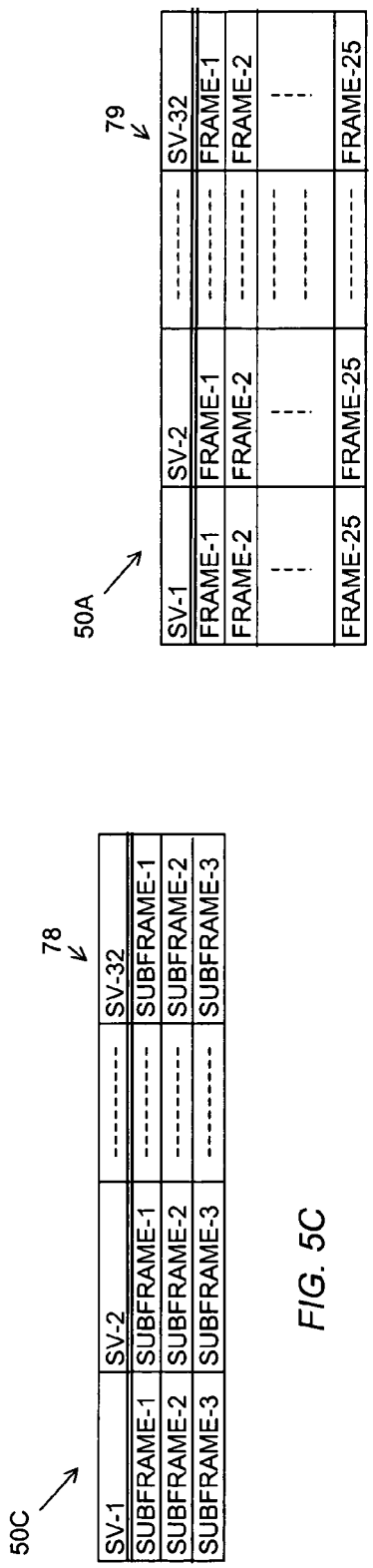
FIG. 5A
FIG. 5C
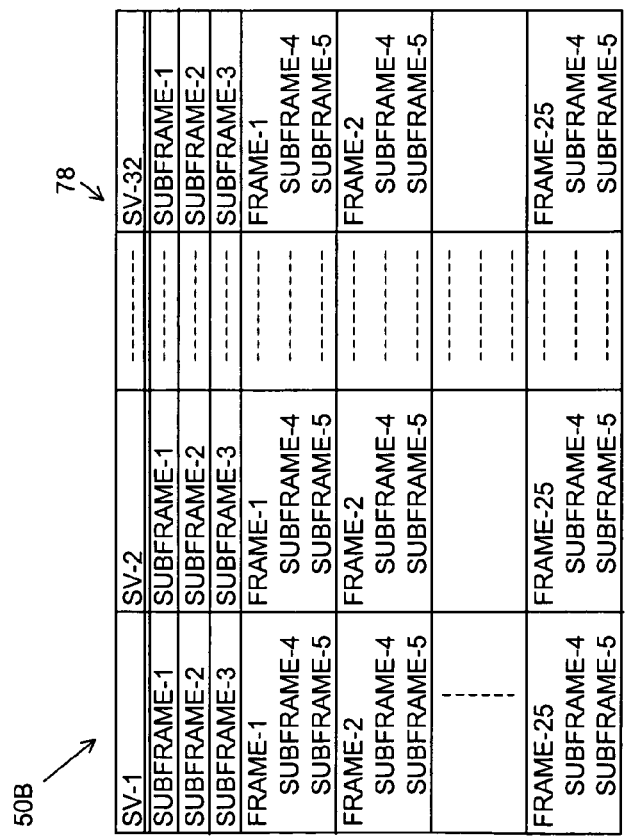
FIG. 5B

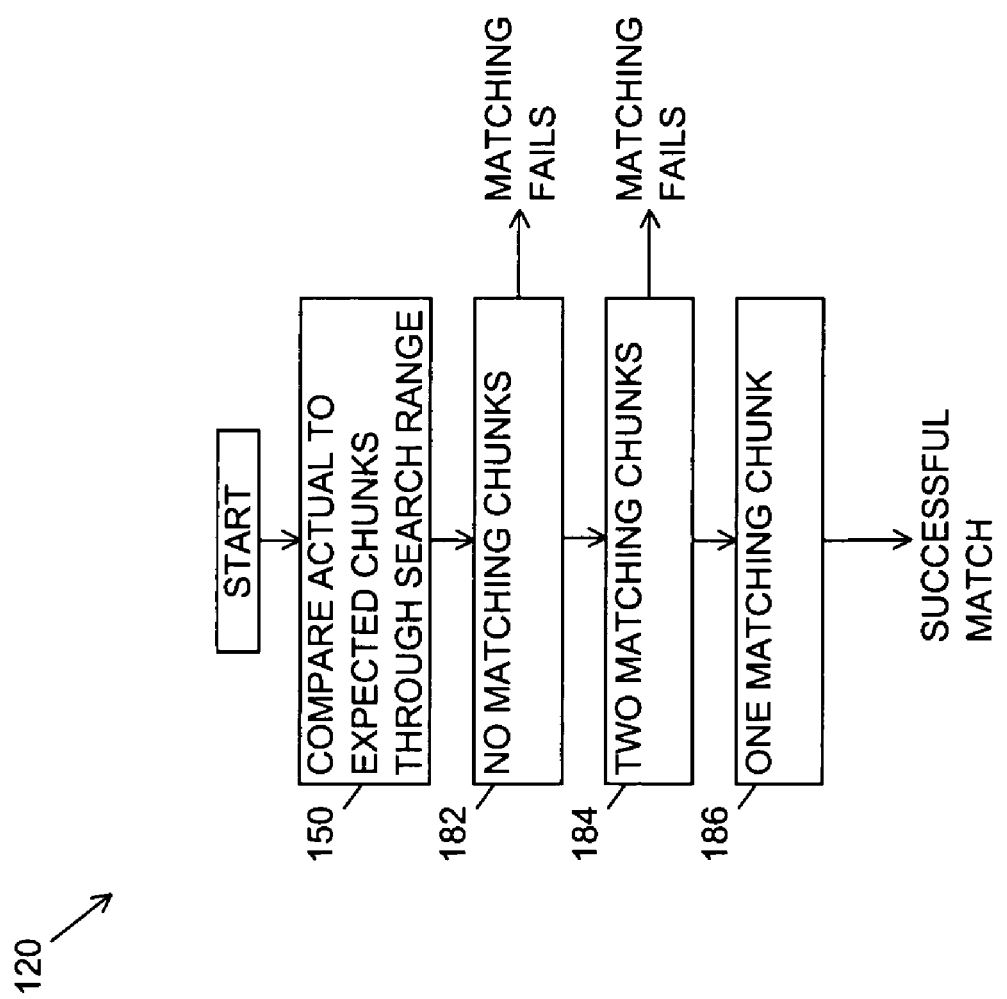

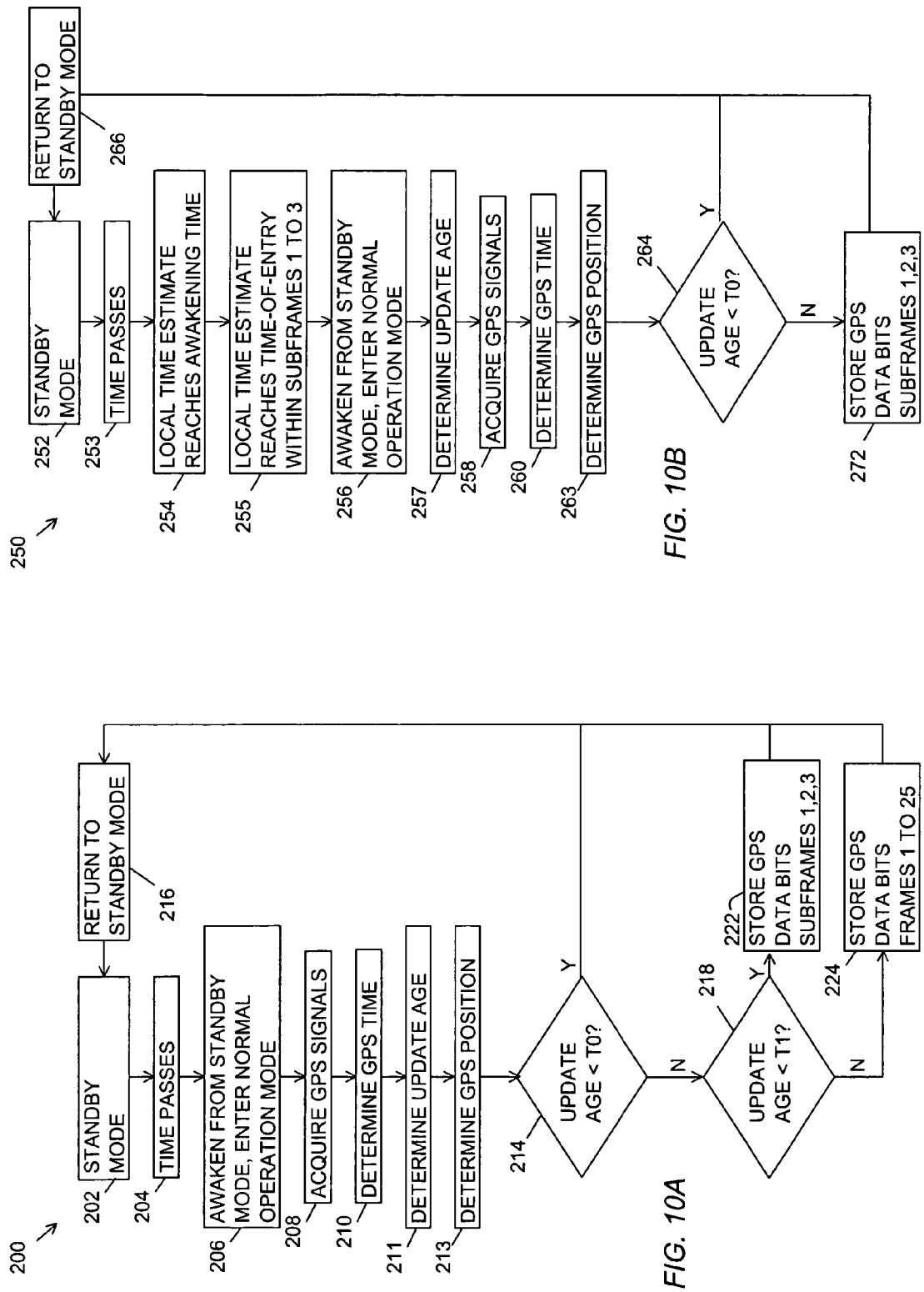

GPS RECEIVER HAVING A PRESCRIBED TIME-OF-ENTRY INTO AN OPERATION MODE

BACKGROUND OF THE INVENTION

1. Field of the Invention

The invention relates generally to global positioning system (GPS) receivers and more particularly to a GPS receiver having fast time to first fix by comparing a chunk of received data bits to chunks of expected data bits within a designated search range of an expected GPS data message.

2. Description of the Prior Art

The global positioning system (GPS) is a system using GPS satellites for broadcasting GPS signals having information for determining location and time. Each GPS satellite broadcasts a GPS signal having message data that is unique to that satellite. The message for a Coarse/Acquisition (C/A) format of the GPS signal has data bits having twenty millisecond time periods. The twenty millisecond data bits are modulated by a one millisecond pseudorandom noise (PRN) code having 1023 bits or chips. The PRN code for each GPS satellite is distinct, thereby enabling a GPS receiver to distinguish the GPS signal from one GPS satellite from the GPS signal from another GPS satellite. The twenty millisecond GPS data bits are organized into thirty second frames, each frame having fifteen hundred bits. Each frame is subdivided into five subframes of six seconds, each subframe having three hundred bits.

One of the important figures of merit for a GPS receiver is its time to first fix, or the time period that it takes the GPS receiver from the time that it is turned on to the time that it begins providing its position and/or time to a user. In order to make this time period short, GPS receivers may be designed for what is sometimes known as a hot start. For a hot start, the GPS receiver starts acquisition with information for its own approximate location, an approximate clock time, and ephemeris parameters for the locations-in-space of the GPS satellites.

For a hot start, when the GPS receiver is turned on or returns to active operation from a standby mode, the GPS receiver processes its approximate time and location with the almanac or ephemeris information to determine which of the GPS satellites should be in-view and generates GPS replica signals having carrier frequencies and pseudorandom noise (PRN) codes matching the estimated Doppler-shifted frequencies and the PRN codes of the in-view GPS satellites. A search pattern or fast Fourier transform is used to find correlation levels between the replica signals and the carrier frequency and the PRN code of the incoming GPS signal. A high correlation level shows that GPS signal acquisition has been achieved at the frequency, code and code phase of the replica and the GPS receiver may begin tracking the frequency and the time-of-arrival of the code of the incoming GPS signals. At this point the GPS receiver knows the timing of the GPS data bits but it cannot determine its position because it does not yet know the absolute GPS clock time.

The GPS clock time is conventionally determined by monitoring the GPS data bits until a TLM is recognized for the start of a subframe. Following the TLM word, the GPS receiver reads a Zcount in the GPS data bits in a hand over word (HOW) to learn a GPS clock time. A current precise location-in-space of the GPS satellite is calculated from the GPS clock time and the ephemeris information. The time-of-arrival of the code of the GPS replica signal is then used to calculate a pseudorange between the location of the GPS receiver and the location-in-space of the GPS satellite. The geographical location fix is derived by linearizing the pseudorange for the approximate location of the GPS receiver and then solving four or more simultaneous equations having the linearized pseudoranges for four or more GPS satellites.

A limitation of the above-described conventional hot start is that the GPS receiver must monitor the GPS messages data bits for up to six seconds or about three seconds on the average to receive one-half subframe for a TLM word; or about nine seconds on the average to receive one and one-half subframes in order to verify that a first TLM word is not a random event of bits. This monitoring time may add significantly and may even be the largest single component of the time to first fix. One possibility for eliminating the monitoring time is to maintain, or quickly receive, a time standard having a time accuracy ten milliseconds or better with respect to GPS time. This accuracy may be maintained over a several hour period in the GPS receiver with a very stable internal clock. Or, the GPS receiver may receive a radio signal such as WWV or a communication signal that requires accurate time for its own purposes such as certain CDMA cellphone signals. The closest twenty millisecond data bit transition is then used to resolve the remaining error. However, these methods for providing ten millisecond or better time accuracy add hardware cost or power consumption or both in the GPS receiver.

SUMMARY OF THE INVENTION

It is therefore an object of the present invention to provide a GPS receiver apparatus and a method having a fast time to first fix and/or low power consumption by determining the GPS clock time without the need to wait until the arrival of one or more Zcounts in the GPS signal, without excessive hardware cost and without a need for ten millisecond time accuracy before GPS time is determined.

Briefly, the present invention stores expected data bits for a GPS signal; uses a coarse time estimate for identifying a search range or a time-of-entry; compares chunks of the expected data bits to a chunk of current data bits received in a GPS signal; and then uses the time corresponding to a successful chunk match to refine the coarse time estimate to the correct GPS clock time.

A GPS receiver of the present invention has an anytime embodiment and a focused embodiment. In the anytime embodiment the GPS receiver stores expected data bits for an entire GPS message chapter of frames one through twenty-five. The GPS receiver may be turned on or awakened at any time from a standby mode to enter an operation mode for providing a GPS clock time and position. The anytime embodiment minimizes latency time after a user request for providing a fast time to first fix. This embodiment might be required for personal use, vehicle navigation or vehicle tracking. In the focused embodiment the GPS receiver stores expected data bits for GPS subframes one through three. A prescribed time-of-entry is designated so that the GPS receiver enters the operation mode within this block and then remains in operation mode only long enough for updating this block (as opposed to the entire GPS message chapter), thereby minimizing power consumption for automatic cycles of standby and operation modes. This embodiment might be required for unmanned battery operated asset management.

In a preferred embodiment, the present invention is a method for determining global positioning system (GPS) clock time, comprising: storing expected data bits for a prescribed block within a GPS message for a GPS signal source, the block having a GPS-based time-of-transmission; providing a coarse time estimate not being guided by the GPS clock time; designating a prescribed time-of-entry based on the time-of-transmission of the block; entering an operational mode for acquiring a GPS signal from the GPS signal source when the time estimate is the time-of-entry; and determining a GPS clock time in the operation mode from the GPS signal.

In another preferred embodiment, the present invention is a global positioning system (GPS) receiver for determining GPS clock time, comprising: a chapter memory for storing expected data bits for a prescribed block within a GPS message for a GPS signal source, the block having a GPS-based time-of-transmission; a clock for providing a coarse time estimate not being guided by the GPS clock time; a standby mode regulator for designating a prescribed time-of-entry based on the time-of-transmission of the block; a signal processor for entering an operational mode for acquiring a GPS signal from the GPS signal source when the time estimate is the time-of-entry; and a GPS time detector for determining a GPS clock time in the operation mode from the GPS signal.

These and other objects and embodiments of the present invention will no doubt become obvious to those of ordinary skill in the art after having read the following detailed description of the preferred embodiments which are illustrated in the various figures.

IN THE DRAWINGS

FIGS. 5A, 5B and 5C are diagrams of full, compact and focused blocks of expected GPS data bits for the GPS receiver of FIG. 1;

FIG. 9 is a flow chart for detecting a successful match for the method of FIG. 7; and FIGS. 10A and 10B are flow charts for anytime and focused embodiments, respectively, for updating expected GPS data bits using standby and operation modes in the present invention.

DETAILED DESCRIPTION OF THE PREFERRED EMBODIMENTS

Figure 1:
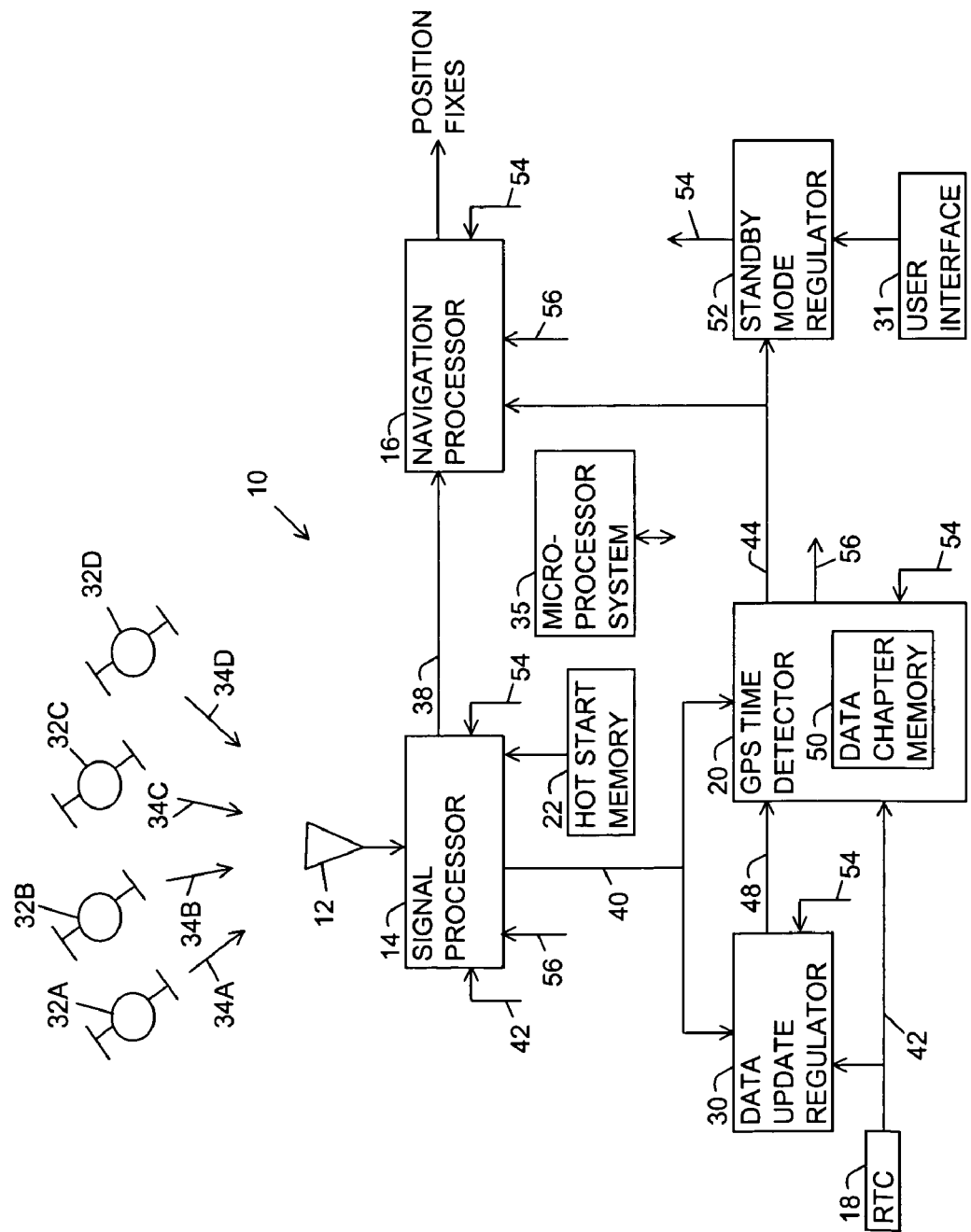
FIG. 1 is a block diagram of a GPS receiver of the present invention having a fast time to first fix by comparing current to expected GPS data bit chunks.

FIG. 1 is a block diagram of a global positioning system (GPS) receiver of the present invention referred to with a reference number 10. The GPS receiver 10 includes a GPS antenna 12, a signal processor 14, a navigation processor 16, a real time clock (RTC) 18, a GPS time detector 20, a hot start memory 22, a data update regulator 30 and a user interface 31. GPS signal sources 32A-D broadcast respective GPS signals 34A-D. The GPS signal sources 32A-D are normally GPS satellites. However, pseudolites may also be used. For convenience the GPS signal sources 32A-D are referred to as GPS satellites 32 and the GPS signals 34A-D are referred to as GPS signals 34 with the understanding that each of the GPS signals 34A-D is broadcast separately with separate GPS message data for each of the GPS signal sources 32A-D. A global navigation satellite system (GNSS) signal source and signal may be used in place of the GPS signal sources 32 and GPS signals 34.

In order to more easily understand the present invention, the structural elements of the best mode of the present invention are described in terms of the functions that they perform to carry out the present invention. It is to be understood that these elements are implemented as hardware components and software instructions that are read by a microprocessor in a microprocessor system 35 or by digital signal processing hardware to carry out the functions that are described.

The GPS antenna 12 converts the GPS signals 34 from an incoming airwave form to conducted form and passes the conducted GPS signals to the signal processor 14. The signal processor 14 includes a frequency downconverter; and carrier, code and data bit signal recovery circuits. The frequency downconverter converts the conducted GPS signals to a lower frequency and digitizes the lower frequency GPS signals to provide digital GPS signals. The signal recovery circuits operate on the digital GPS signals to acquire and track the carrier, code and navigation data bits for providing respective timing signals 38 and GPS data bit streams 40 for each of the GPS satellites 32. Parallel processing of the respective digital GPS signals is preferred so that the timing signals 38 and the data bit streams 40 are determined in parallel for several GPS satellites 32, typically four or more. The timing signals 38 generally include code phase, code chip timing, code cycle timing, data bit timing, and Doppler tuning.

The timing signals 38 are passed to the navigation processor 16 and the data bit streams 40 are passed to the GPS time detector 20 and the data update regulator 30. The GPS time detector 20 uses GPS clock time estimates 42 from the RTC 18 and the data bit streams 40 for determining a true GPS clock time 44 and passes the true GPS clock time 44 to the navigation processor 16. The navigation processor 16 includes a pseudorange calculator and a position detector using the timing signals 38 and the GPS clock time 44 for determining pseudoranges between the GPS antenna 12 and the GPS satellites 32 and then using the pseudoranges for determining a position fix. The navigation processor 16 passes the GPS clock time and position to the user interface 31.

The data update regulator 30 passes a specified collection 48 of data bits of the GPS data bit streams 40 to a data chapter memory 50 within the GPS time detector 20 for updating a block of GPS message data in the chapter memory 50. The user interface 31 may include keys, a digital input/output capability and a display for enabling a user to operate the GPS receiver 10 and view results of the operation of the GPS receiver 10. In general the user interface 31 is coupled through the microprocessor system 35 to each of the other elements of the GPS receiver 10.

The GPS receiver 10 also includes a standby mode regulator 52. The standby mode regulation 52 controls the GPS receiver 10 through control signals 54 to have an operation mode and a standby mode. However in the best mode, the GPS receiver 10 may be directed to enter the standby mode at any time from the user interface 31.

In the operation mode, the GPS receiver 10 acquires the GPS signals 34 and determines a true GPS clock time 44; and uses the GPS clock time 44 for determining a two or three dimensional position fix. If time only is required, the GPS receiver 10 returns to the standby mode without determining the position fix. During the standby mode, the GPS receiver 10 reduces its power consumption and maintains standby data, including its position, in the hot start memory 22 for a state of readiness. The standby data includes the last known GPS time and position of the GPS receiver 10. Data for GPS ephemeris and almanac orbital parameters 56 is stored in the hot start memory 22 or the chapter memory 50.

When the GPS receiver 10 enters the operation mode after a time period in the standby mode, the signal processor 14 uses the GPS clock time estimates 42, the almanac or ephemeris parameters and the standby data for quickly providing the signal timing signals 38 and the data bit stream 40. The navigation processor 16 uses the GPS clock time 44, the stored ephemeris parameters, and the timing signals 38 in order to compute a first position fix for what is known as a hot start fast time to first fix (TTFF). The microprocessor system 35 is interconnected for controlling the signal processor 14, navigation processor 16, real time clock (RTC) 18, GPS time detector 20, hot start memory 22, data update regulator 30, user interface 31, data chapter memory 50 and standby mode regulator 52. The functions of the signal processor 14, navigation processor 16, real time clock (RTC) 18, GPS time detector 20, hot start memory 22, data update regulator 30, user interface 31, data chapter memory 50 and standby mode regulator 52 are implemented by the microprocessor 35 according to programmed software instructions on one or more computer readable mediums or by digital signal processing hardware or by a combination.

There are two embodiments, or wakeup modes, for the GPS receiver 10 to enter the operation mode from the standby mode. In a first wakeup mode, termed an "anytime" embodiment, the standby mode regulator 52 awakens the GPS receiver 10 from the standby mode to the operation mode at any time that is requested through the user interface 31. In a second wakeup mode, termed a "focused" embodiment, the standby mode regulator 52 awakens the GPS receiver 10 from the standby mode to the operation mode only during prescribed times-of-entry, as ascertained from the GPS time estimates 42, when subframes one through three are expected.

Figure 2:
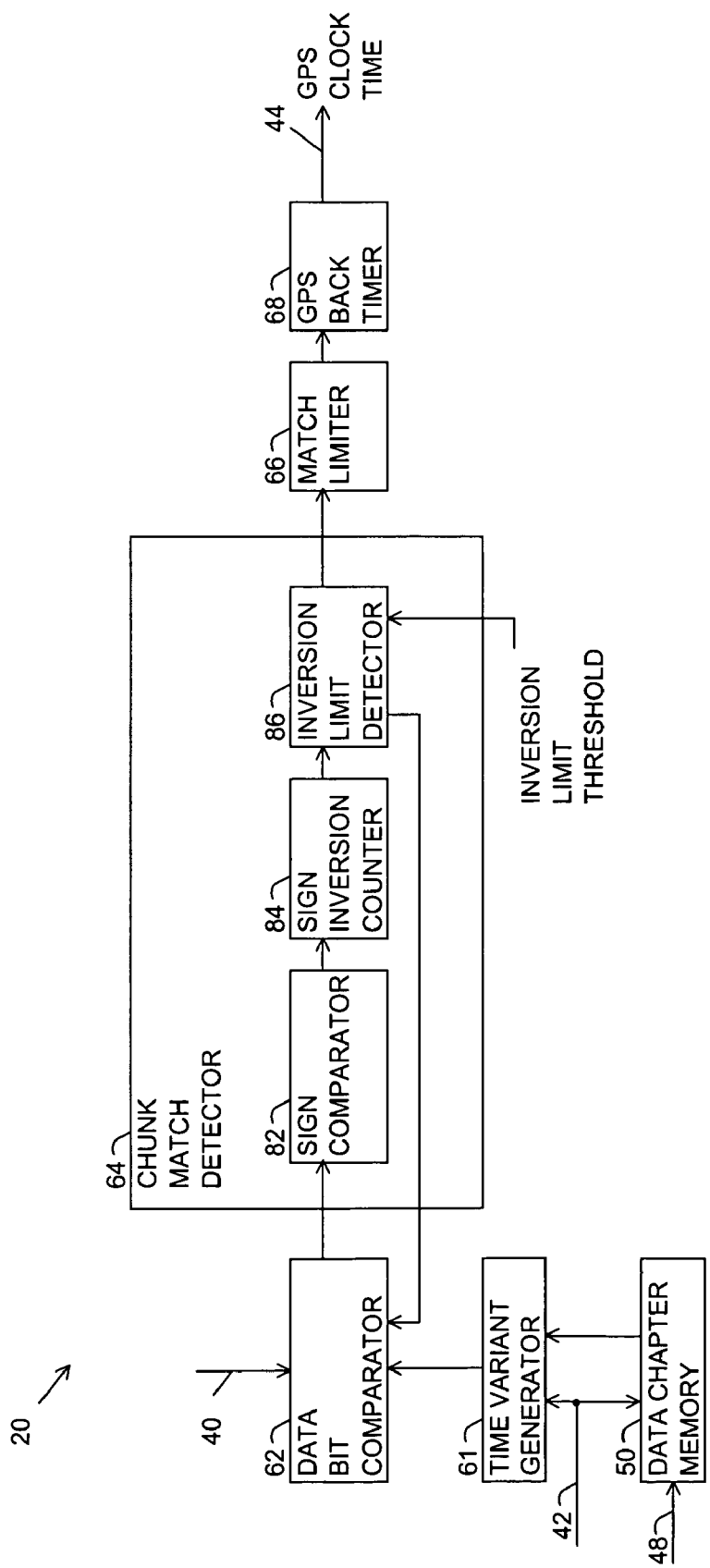
FIG. 2 is a block diagram of a GPS time detector for the GPS receiver of FIG. 1.

FIG. 2 is a block diagram of the GPS time detector 20 of the present invention. A primary object of the GPS time detector 20 is to determine the GPS clock time 44 quickly when the GPS receiver 10 enters an operation mode after having been in a standby mode. The GPS time detector 20 includes the data chapter memory 50, a time variant generator 61, a data bit comparator 62, a chunk match detector 64, a match limiter 66 and a GPS back timer 68. The data chapter memory 50 stores a block of expected GPS data bits for a chapter of GPS message data. In conventional GPS receivers the data bit steam 40 is observed for one to two or even more GPS subframes in order to determine a true GPS clock time by reading a Zcount in a hand over word (HOW) near the start of each GPS subframe. Importantly, the GPS time detector 20 of the present invention provides a method that is faster than the conventional method for determining the true GPS clock time 44 and thereby provides a faster hot start TTFF than the conventional method.

Figure 3:
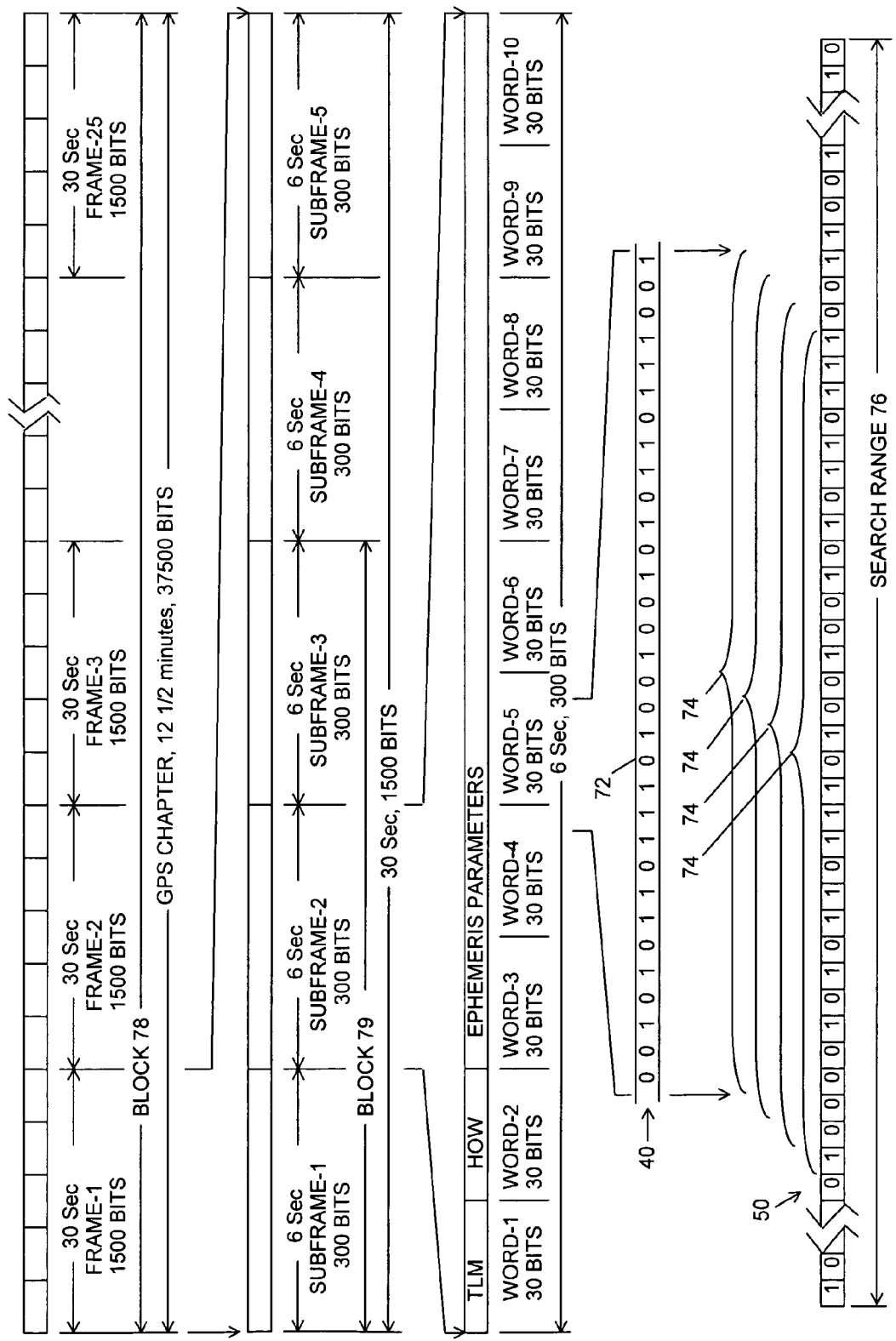
FIG. 3 is a chart illustrating current and expected GPS data bits for the GPS receiver of FIG. 1.

FIG. 3 is a chart illustrating an exemplary expected data chunk within a chapter of GPS message data for the C/A code in the GPS signals 34. The GPS message chapter for each of the GPS satellites 32 comprises twenty-five frames known as frame-1 through frame-25. The frames are thirty seconds long and contain 1500 data bits each. The total length of the chapter is twelve and one-half minutes with 37,500 data bits. Each frame has five subframes known as subframe-1 through subframe-5. All the GPS satellites 32 are synchronized to start subframe one of frame one at the same time.

The subframes are six seconds long and contain 300 data bits each. Each subframe has ten words known as word-1 through word-10. The words are 0.6 seconds long and contain 30 data bits each. The word-1 of each subframe, known as the TLM word, is used for synchronizing or re-synchronizing the GPS receiver 10 to the subframes of the GPS message data bits. The word-2 of each subframe, known as the hand over word (HOW), contains the Zcount data bits having the absolute GPS clock time referred to the start of the TLM word of the next subframe. The words three through ten carry general GPS message information. The information in subframe-1, subframe-2 and subframe-3 includes the ephemeris orbital parameters for the specific GPS satellite 32 broadcasting the GPS signal 34. The general information in subframe-4 and subframe-5 includes almanac parameters, health semaphores, special messages, spares, ionospheric information, UTC data, and flags for all of the GPS satellites 32. Detailed information on the GPS message is available in the GPS Interface Control Document ICD-GPS-200 that is available from many sources including the Navtech Seminars & Navtech Book and Software Store located in Arlington, Va.

The subframe-2 is illustrated as an example. The subframe-2 for each GPS satellite 32 carries ephemeris parameters for that GPS satellite 32. Data bits bridging word-4 and word-5 are illustrated as an example for an exemplary current chunk 72 of the GPS data bit stream 40 that is received in the incoming GPS signal 34 for one of the GPS satellites 32. The expected data bits are stored in the chapter memory 50. A search range 76 (FIG. 4) is selected from within a block 78 or a prescribed block 79 of the expected data bits. The block 78 stores an entire chapter for the expected GPS message data bits for all frames, frame-1 through frame-25, for all GPS satellites 32, SV-1 through SV-32. The block 79 stores the expected GPS message data bits for subframe-1 through subframe-3 for all GPS satellites 32.

Returning to FIG. 2 the time variant generator 61 uses the GPS time estimate 42 for augmenting the expected data bits stored in the chapter memory 50 with the time-variant GPS data bits that change in an expected way by inserting the time-variant expected data bits into the subframes of the stored expected data bits. The time-variant expected data bits include the Zcount bits and parity bits for the Zcount. The data bit comparator 62 receives the expected data bits from the data chapter memory 50 through the time variant generator 61 and bit-by-bit compares the bits of the current incoming chunk 72 from the data bit stream 40 to bits of the chunks 74 of the expected data bits within the search range 76.

The result of each bit comparison is a positive sign when the bits are both 1's or both 0's, and a negative sign when one bit is a 1 and the other bit is a 0. The data bit comparator 62 passes the signs to the chunk match detector 64. The comparisons continue until either a successful match is found or the search range 76 match fails. The bit-by-bit comparison may be an exclusive-OR of the two bits. The current data bit chunk 72 and the expected data bit chunks 74 are illustrated in the FIG. 3 for thirty-two bits. However, it should be understood that other sizes can be used for the chunks 72, 74.

The chunk match detector 64 includes a sign comparator 82, a sign inversion counter 84, and an inversion limit detector 86. The sign comparator 82 compares consecutive signs and detects a sign inversion when a positive sign follows a negative sign or a negative sign follows a positive sign. An exclusive-OR of the two signs may be used for the sign comparison.

The sign inversion counter 84 counts the sign inversions corresponding to each chunk 74 and passes the inversion count to the inversion limit detector 86. The inversion limit detector 86 compares the inversion count to a selected inversion limit threshold. When the inversion count exceeds the inversion limit threshold, the inversion limit detector 86 labels the expected bit data chunk 74 that is being evaluated as a match fail and directs the data bit comparator 62 to slide one bit in the search range 76 to identify and start on a new expected data bit chunk 74. When an entire expected data bit chunk 74 has been compared to the incoming chunk 72 without exceeding the inversion limit threshold, the chunk 74 is labeled as a match. The inversion limit threshold of two is preferred.

For thirty-two bit chunks, and using 1 for a positive sign and using 0 for a negative sign, the signs of FFFFFFFF and 00000000 in hexadecimal notation signify chunk comparisons having no sign inversions. The signs of F00FFFFF or 80000003 are examples of chunk comparisons having two sign inversions.

When one chunk 74 has been found to match, the data bit comparator 62, the chunk match detector 64 and the match limiter 66 continue in the same fashion in order to determine if any other chunks 74 within the search range 76 match the chunk 72. If a second match is found within the search range 76, the match limiter 66 causes the GPS time detector 20 of the present invention to abandon the chunk comparisons and the GPS receiver 10 reverts to the conventional method of determining the GPS clock time 44 by monitoring the GPS data bit stream 40 until a reliable Zcount can be read from a HOW near the start of a subframe. When one and only one chunk 74 is found within the search range 76 to match the chunk 72, the match is declared to be successful.

When one and only one match is detected, the GPS clock time 44 is determined by the back timer 68 according to an equation 1, below. In the equation 1: the time is in milliseconds, the subframe start is the GPS time corresponding to the start of the first data bit of subframe in which the matching chunk 74 is located, the word count is the word (one through ten) where the first bit of the matching chunk 74 is located and the bit count is the depth of the first bit of the matching chunk 74 within the word where the first bit is located.

$$\text{time} = \text{subframe start} + (\text{word count}) * 600 + (\text{bit count}) \qquad (1)$$
$$*20$$

Figure 4A:
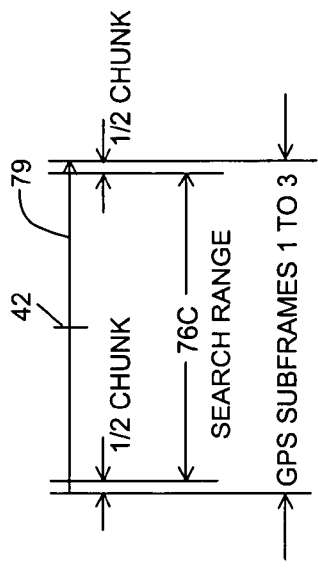
FIGS. 4A and 4B are charts illustrating first and second exemplary search ranges of expected GPS data bits for an anytime embodiment of the GPS receiver of FIG. 1.
Figure 4B:
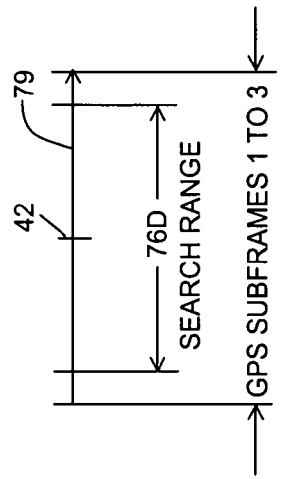

FIGS. 4A and 4B are charts of maximum and minimum search ranges 76A and 76B, respectively, for the search range 76 of the expected data bits for the anytime embodiment. The search ranges 76A and 76B are formed within the block 78. A preferred maximum search range 76A is defined as the length of a frame (1500 bits) minus the length of the chunk 74 (32 bits) minus one bit for the edges for a total of 1467 bits in order to avoid repeating subframes one through three. A preferred minimum search range 76B is defined as the estimated accuracy of the estimated clock time 42 converted into data bits according to the data bit time (twenty milliseconds for the GPS C/A code). The search ranges 76A and 76B are centered at the expected data bit that is predicted at the GPS clock time estimate 42. The estimated accuracy may be computed from the estimated drift (times two to convert from drift specified as plus or minus to a total range) of the RTC 18 times the time period in standby mode. For example, a one part per million (ppm) drift rate after a day results in an estimated accuracy of about 9 data bits ($2 \times 0.000001 \times 60 \times 60 \times 24/0.02$). In an alternative embodiment the time estimate 42 is provided by a transfer time standard in a radio signal. The idea of the invention is that coarse time estimates that may err by up to fifteen seconds with respect the GPS clock time are used for the time estimate 42 and then the time estimate 42 is refined to the GPS clock time by finding the successful chunk match. The coarse time estimate may or may have once been set by the GPS clock time but it has drifted from the GPS time because it has not been updated or guided by the GPS system since the time it was set hours, days, weeks or even months ago.

Figure 4C:
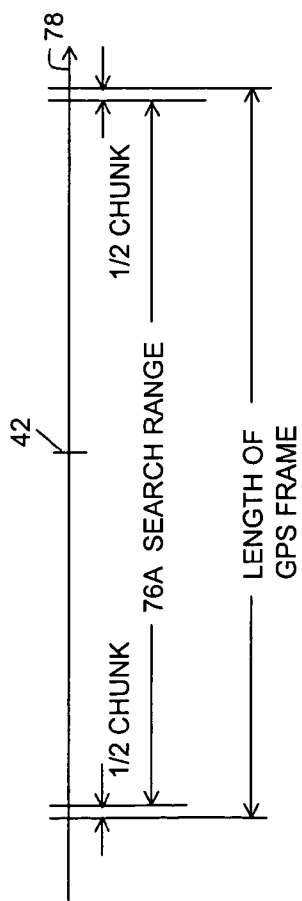
FIGS. 4C and 4D are charts illustrating first and second exemplary search ranges of expected GPS data bits for a focused embodiment of the GPS receiver of FIG. 1.
Figure 4D:
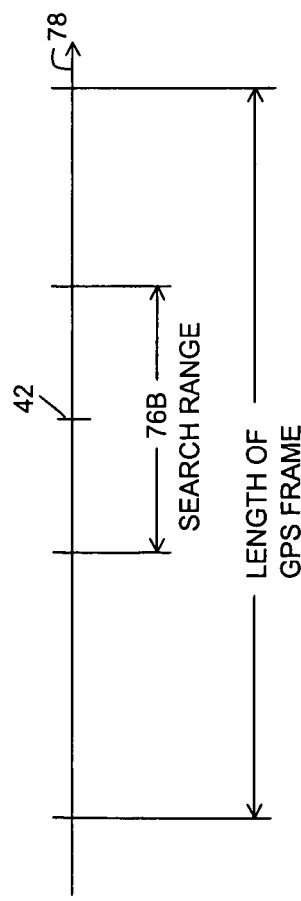

FIGS. 4C and 4D are charts of the maximum and minimum search ranges 76C and 76D, respectively, for the search range 76 of the expected data bits for the focused embodiment. The search ranges 76C and 76D are formed within the prescribed block 79. The preferred maximum search range 76C is defined as the length of the GPS subframes one through three (900 bits) minus the length of the chunk 74 (32 bits) minus one bit for the edges for a total of 867 bits. The preferred minimum search range 76D is defined as the estimated accuracy of the estimated clock time 42 converted into data bits according to the data bit time (twenty milliseconds for the GPS C/A code) plus the variation in the times that the signal processor 14 might require between the time of the turn-on at the time-of-entry and the time when the GPS signal 34 have been acquired in order to provide the current GPS data bits in the data bit stream 40. The search ranges 76C and 76D are centered at the expected data bit that is predicted at the GPS clock time estimate 42.

FIGS. 5A, 5B and 5C are data illustrations for full, compact and focused embodiments 50A, 50B and 50C for the data chapter memory 50. The full and compact embodiments 50A and 50B store the block 78 of expected GPS message data bits for frame-1 through frame-25, for GPS satellites 32, SV-1 through SV-32. In the full embodiment 50A, subframes one through three are repeated for the frames one through twenty-five for each of the GPS satellites 32. In the compact embodiment 50B, the subframes one through three are stored once and the subframes four and five are stored for each of the satellites 32. The focused embodiment 50C stores only the subframes one through three for each of the GPS satellites 32.

Figure 6B:
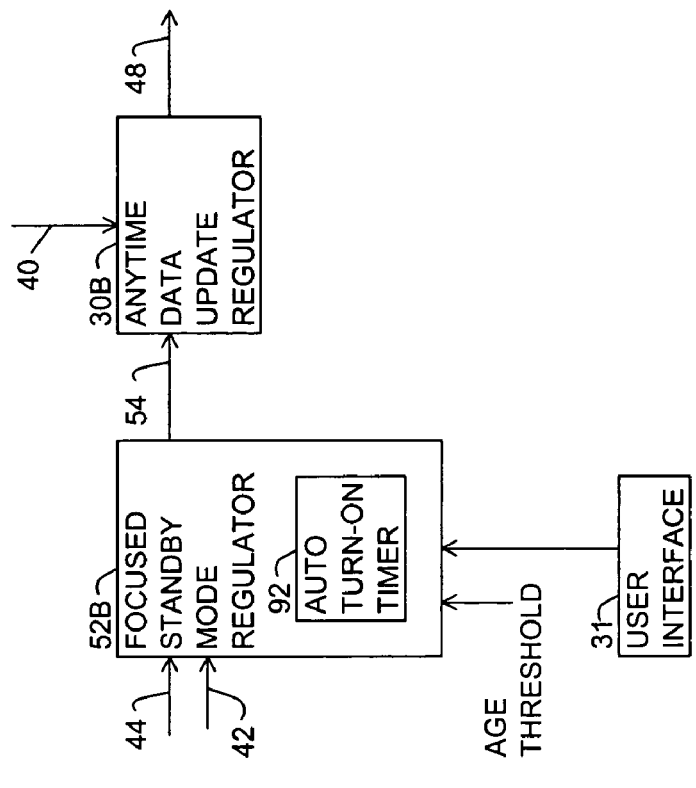
FIGS. 6A and 6B are block diagrams of anytime and focused embodiments, respectively, of a standby time regulator and a data update regulator for the GPS receiver of FIG. 1.
Figure 6A:
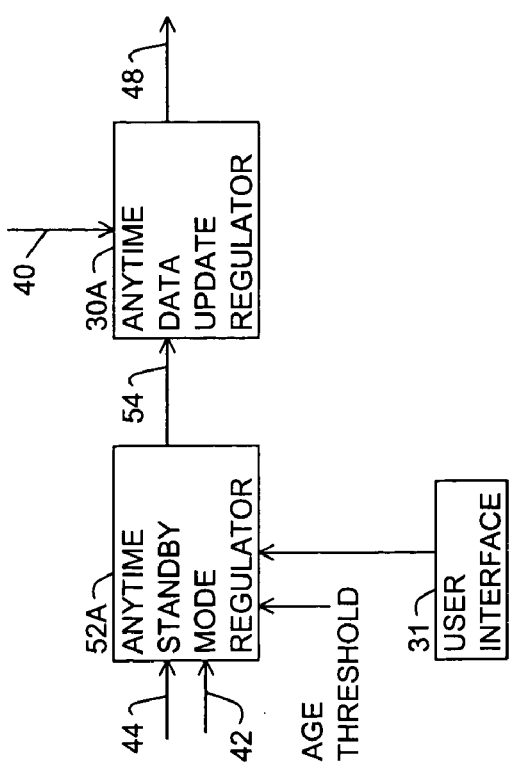

FIGS. 6A and 6B are block diagrams of anytime and focused embodiments, respectively, for the standby mode regulator 52 and the data update regulator 30. In the anytime embodiment the standby mode regulator 52 and the data update regulator 30 are referred to by the reference identifiers 52A and 30A, respectively. In focused embodiment the standby mode regulator 52 and the data update regulator 30 are referred to by the reference identifiers 52B and 30B, respectively. In the anytime embodiment, the standby mode regulator 52A provides the control signal 54 to initiate the operation mode at any time that is designated by the user interface 31. In the focused embodiment, the standby mode regulator 52B provides the control signal 54 to initiate the operation mode automatically according to a timer only when the GPS time estimates 42 indicate that the subframes one through three are currently available in the incoming GPS signal 34.

For the anytime embodiment, the standby mode regulator 52A compares the GPS clock time 44 to the time of the last update of the expected data bits in the memory 50A, B for the GPS satellites 32 that are currently available. When the update age is less than a selected ephemeris age threshold, the standby mode regulator 52A directs the GPS receiver 10 to obtain a position and return to the standby mode unless the user interface 31 requests continued operation. When the update age in the anytime embodiment for the GPS receiver 10 is greater than the ephemeris age threshold or the ephemeris age threshold is not used, the standby mode regulator 52A controls the GPS receiver 10 to remain in the operation mode until the subframes one through three are passed through the data update regulator 30A in the data collection 48 to the memory 50A,B. The ephemeris age threshold is selected to be a time period when the ephemeris parameters are not expected to have changed, preferably not greater than two hours. When the standby time period is greater than a selected almanac age threshold, the standby mode regulator 52A directs the GPS receiver 10 to remain in operation until the memory 50A,B is updated for the frames one through twenty-five. The almanac age threshold is selected to be a time period when the almanac parameters are not expected to have changed, preferably not greater than about six hours.

For the focused embodiment, the GPS receiver 10 the standby time regulator 52B includes an automatic turn-on timer 92. The timer 92 is programmed for a periodic time cycle or interval for initiating an operation mode for determining time or determining time and position. The standby mode regulator 52B uses the time estimates 42 and the periodic turn-on time for automatically initiating the operation mode precisely at a designated time-of-entry following the turn-on time indicated by the timer 92. The time-of-entry is designated so that the GPS subframes one through three are arriving at the GPS receiver 10 when the GPS receiver 10 first begins providing valid data bits in the data bit stream 40 after acquisition of the carrier, code and data bit timing. The designated time-of-entry precedes the mid-point of the GPS subframes one through three in order to allow for the time length for the signal processor 14 to acquire the carrier frequency and code timing of the GPS signal 34.

The standby mode regulator 52B compares the GPS clock time 44 to the time of the last update of the expected data bits in the memory 50C for the GPS satellites 32 that are currently available. When the update age is less than a selected ephemeris age threshold, the standby mode regulator 52B directs the GPS receiver 10 to obtain a position and return immediately (preferably within one second) to the standby mode. When the update age in the focused embodiment for the GPS receiver 10 is greater than the ephemeris age threshold or the ephemeris age threshold is not used, the stand mode regulator 52B controls the GPS receiver 10 to remain in the operation mode until the data collection 48 for subframes one through three are passed through the data update regulator 30B to the memory 50C. The standby mode regulator 52B directs the GPS receiver 10 to return immediately (preferably within one second) to the standby mode after the subframes one through three have been updated.

Figure 7:
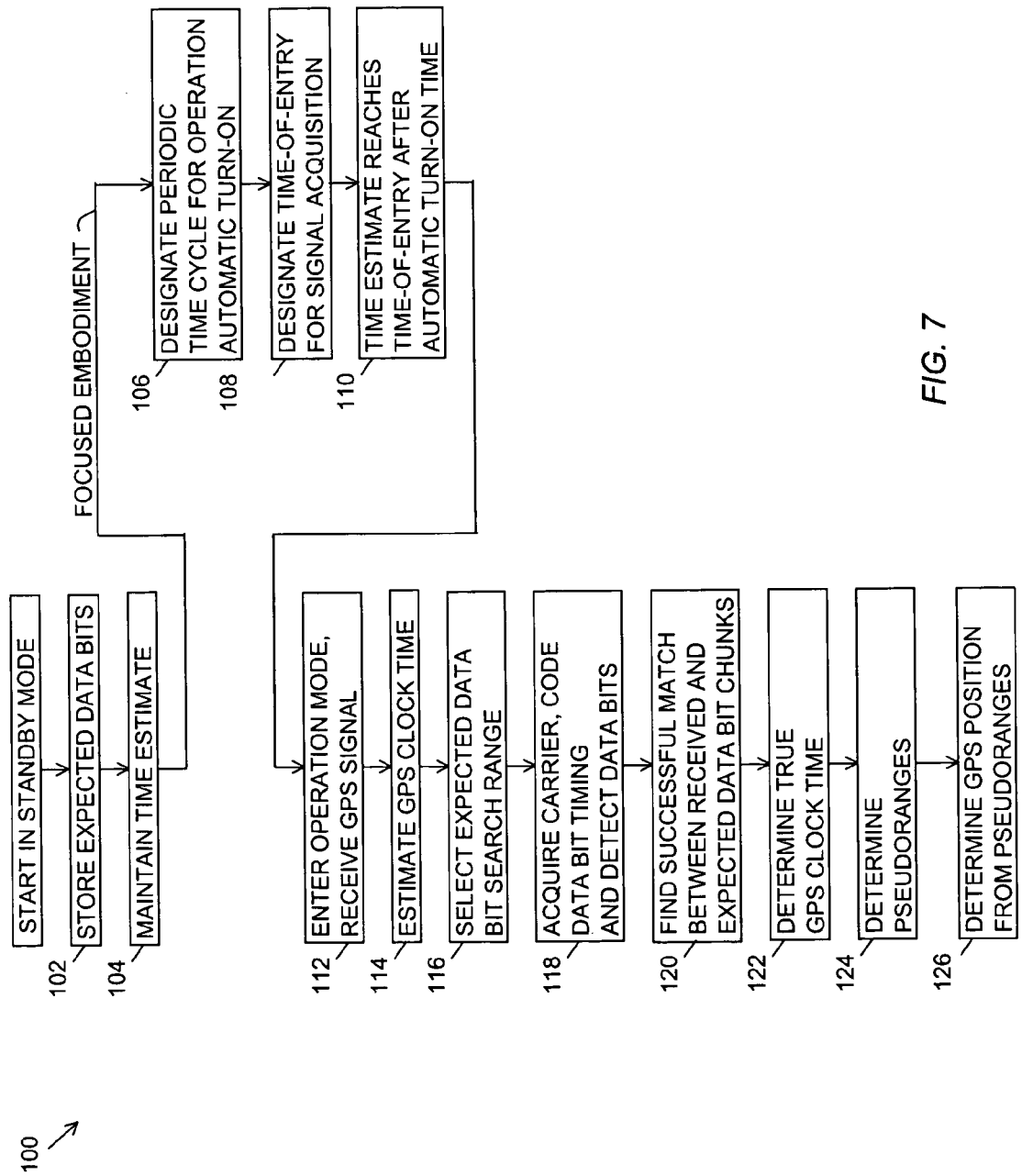
FIG. 7 is a flow chart of a method of the present invention having a fast time to first fix by comparing current to expected GPS data bit chunks.

FIG. 7 is a flow chart of a method, referred to with a reference number 100, of the present invention for finding GPS clock time by matching a chunk of data bits received in the incoming GPS signal with a chunk of expected data bits that are stored locally. At the start a GPS receiver is in a standby mode. In a step 102 while in standby mode, expected GPS data bits are being maintained (stored) in memory storage. In a step 104 while in the standby mode, an estimate of time is being maintained with a battery backed integrated circuit real time clock or by some other time keeping means.

For a focused embodiment a standby time interval is designated for cycling between for standby and operation mode is designated in a step 106 for automatic turn on from the standby mode to the operation mode. A time interval from a few minutes to a few months may be used depending upon how often the GPS time and/or position is required, and the accuracy that is maintained in the estimated time in the standby mode in order to ensure turn-on awakening during subframes one through three. In a step 108 a time-of-entry is designated as the time-of-arrival of the GPS subframes one through three in the GPS signal minus an expected time for the GPS receiver to acquire carrier, code and data bit timing for the GPS signal. Preferably the time-of-entry is designated so that the GPS receiver first begins providing GPS message data bits after turn-on when the GPS message is in the middle of the GPS subframe-2. The time-of-entry of the step 108 can be considered fine tuning of the automatic turn-on time of the step 106. In a step 110, after the turn-on time from the periodic positioning time interval is reached the GPS receiver automatically turns on when the estimated time matches the designated time-of-entry. In the anytime mode the steps 106-110 are not required.

In a step 112 the GPS receiver enters the operational mode and receives the GPS signal. In a step 114 the GPS time is estimated (if it is not already estimated in the focused embodiment) from the time estimate that is being maintained. In a step 116 the estimated GPS time is used for selecting an expected data bit (EDB) search range. In a step 118 the GPS time estimate is used for acquiring the carrier, code and data bits of the GPS signal for the current incoming chunk. At this point the meanings of the current data bits are not yet known because their position in the GPS message is not yet known.

The chunk of the received data bits is compared to chunks of the expected data bits in a step 120 until either a successful match is found or the matching fails for the EDB search range. If the attempt at matching fails, the received GPS data bits are monitored until the GPS time may be determined from the Zcount in the hand over word (HOW) in a conventional manner. In a step 122, when a successful match is detected, the true GPS time is determined from the position of the matching chunk of expected data bits within a GPS message chapter. In a step 124 the true GPS time is used with the carrier, code and data bit timing signals for determining a pseudorange for the GPS satellite transmitting the GPS signal. Several GPS signals are processed in parallel so that several pseudoranges are determined. In a step 126 the pseudoranges to several GPS satellites are used for determining a position. In a timing only version of the GPS receiver 10 the step 126 is not always necessary.

Figure 8:
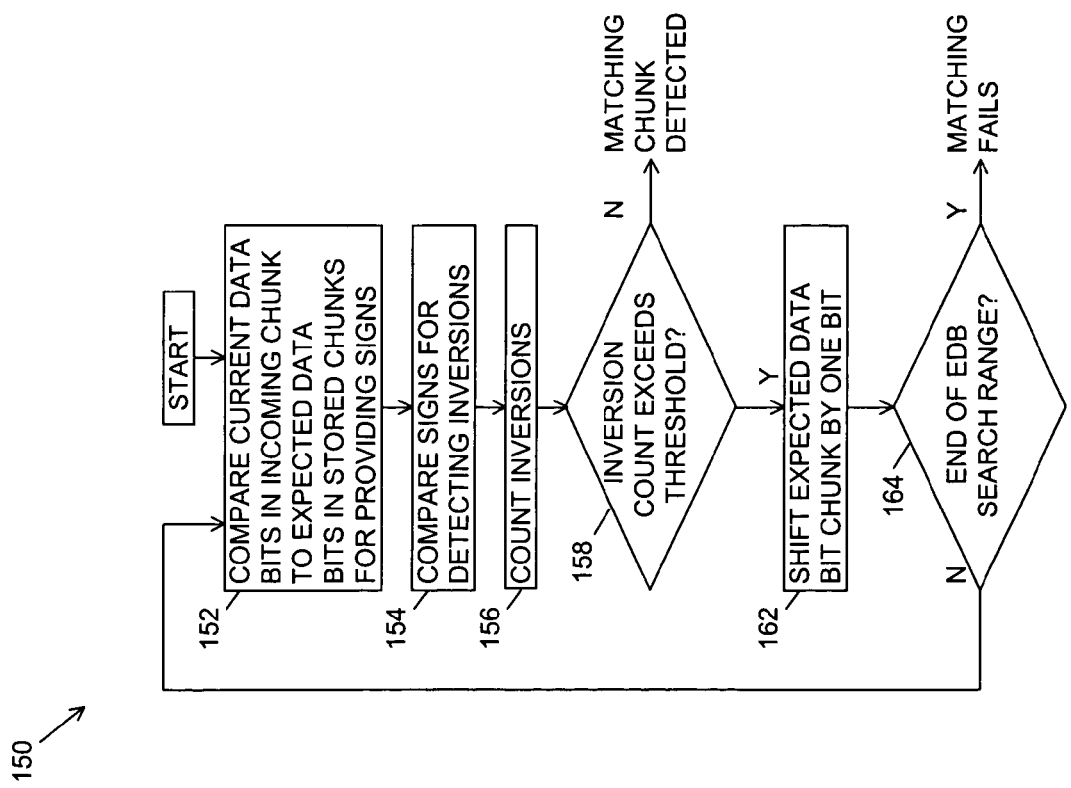
FIG. 8 is a flow chart for detecting a matching chunk for the method of FIG. 7.

FIG. 8 is a flow chart of a method, referred to with a reference number 150, for detecting a match between a stored expected data bit (EDB) chunk and the incoming chunk received in the GPS signal. At the start, the frequency, code phase, and data bits of the GPS signal have been acquired but the meanings of the current incoming data bits are not yet known because the position of the data bits in the GPS message is not yet known. In a step 152 the bits of the current incoming signal chunk are compared to the stored bits in the expected chunk on a bit-by-bit basis for providing signs. In a step 154 consecutive signs are sign-by-sign compared for detecting inversions. In a step 156 the sign inversions are counted. In a step 158 the inversion count is compared to a selected inversion limit threshold.

When the inversion count is complete for the length of the current expected data bit chunk and the sign inversion count is equal or less than the threshold, the current expected data bit chunk is labeled as a matching chunk. In a step 162 when the inversion count exceeds the threshold, the current expected data bit chunk is incremented by one bit in the search range. In a step 164 all the chunks within the remaining search range are checked for a second matching chunk. A second chunk matching chunk indicates that there is not a successful chunk match. When the end of the expected data bit (EDB) search range has been reached without detecting a matching chunk, or a second matching chunk is detected, there is no successful chunk match within the search range and the attempt at finding a successful chunk match fails. Otherwise, if the end of the search range has not been reached, the step 152 is repeated for comparing bits for the new expected data bit chunk, and so on.

FIG. 9 is a flow chart of details of the above-identified step 120 of the present invention for determining when there is a successful match between a chunk of GPS data bits in the incoming GPS signal that is received and a chunk of stored, expected GPS data bits. At the start, the frequency, code phase, and data bits of the GPS signal have been acquired but the meanings of the current incoming data bits are not yet known. In the step 150 described above, the actual received data bit chunk is compared to the expected data bit (EDB) chunks. In a step 182 the matching fails when no matching EDB chunks are detected. In a step 184 the matching fails when two matching EDB chunks are detected. Finally, in a step 186, matching is successful when one and only one EDB chunk matches the actual data bit chunk.

FIG. 10A is a flow chart of an anytime embodiment of a method of the present invention, referred to by a reference number 200, for awakening from a standby mode, computing GPS time and position, and updating expected GPS message data bits in a local memory in a GPS receiver. In a step 202 the GPS receiver is in a low power standby mode. In a step 204, time passes in the standby mode and the expected data bits grow older that are stored in the memory 50. In a step 206 the GPS receiver awakens from the standby mode to enter a normal operation mode. In a step 208 the GPS receiver acquires carrier, code and data bit timing of GPS signals and provides current data bits. In a step 210 the GPS receiver uses the data bits for detecting a successful chunk match as described above and uses the successful chunk match for determining the GPS clock time 44. In a step 211, the GPS receiver determines the update age of the stored expected data bits in the memory 50 for the available GPS satellites 32. In a step 213, the GPS receiver determines its position. In an optional step 214 update age is compared to a selected ephemeris age threshold T0. The threshold T0 is preferably about one hour and may be in a range of about fifteen minutes about two hours.

When the update age is less than the threshold T0, a step 216 enables or allows the GPS receiver to return to the step 202 for the standby mode. In a step 218, when the standby time is greater than the threshold T0, the update age is compared to a selected almanac age threshold T1. The threshold T1 is preferably about two hours and may be in a range of about one-half hour to about six hours. In a step 222 when the update age is less than the threshold T1, the GPS receiver remains in the normal operation mode long enough to receive and update the GPS data bits for subframes one through three. When the subframes one through three are updated the GPS receiver may return through the step 216 to the standby mode of the step 202. In a step 224 when the update age is greater than the threshold T1, the GPS receiver remains in the normal operation mode long enough to receive and update the GPS data bits for frames one through twenty-five. When the frames one through twenty five are updated the GPS receiver may return through the step 216 to the standby mode of the step 202. After the step 202, time passes in the step 204 until the GPS receiver again awakens in the step 206 and so on.

FIG. 10B is a flow chart of a focused embodiment of a method of the present invention, referred to by a reference number 250, for awakening from a standby mode, computing a GPS time and position, and updating expected GPS message data bits in a local memory in a GPS receiver. In a step 252 the GPS receiver is in a low power standby mode. While in the standby mode, the GPS receiver maintains a local time estimate of GPS time. In a step 253, time passes in the standby mode and the expected data bits grow older that are stored in the memory 50. In a step 254 the time estimate reaches an awakening time. The awakening time may be programmed from every few minutes to several days or even weeks according to the stability the RTC 18 for accurately predicting the GPS time estimate 42 within the subframes one through three. In a step 255, when the awakening time has been reached, the local time estimate indicates a time-of-entry when the GPS signal is centered in subframe-2 after allowing for the time to acquire the GPS signal. In a step 256 the GPS receiver awakens from the standby mode at the time-of-entry to enter the operation mode so that the current incoming data bits are expected to be centered in subframe-2. In a step 257, the GPS receiver determines the update age of the stored expected data bits in the memory 50 for the available GPS satellites 32. In a step 258 the GPS receiver acquires carrier, code and data bit timing of GPS signals and receives current data bits. In a step 260 the GPS receiver uses the incoming and expected data bits for detecting a successful chunk match as described above and uses the successful chunk match for determining the GPS clock time 44. In a step 263 the receiver determines its position. In an optional step 264 the update age is compared to the ephemeris age threshold T0.

When the update age is less than the threshold T0 the GPS receiver expeditiously returns through a step 266 to the standby mode of the step 252. In a step 272 when the update age is greater than the threshold T1 the GPS receiver remains in the normal operation mode long enough to receive and update the GPS data bits for subframes one through three and then expeditiously returns through the step 266 to the standby mode of the step 252. The GPS receiver returns to the standby mode 252 within one second, or at least within six seconds, preferably as quickly as possible after determining the GPS clock time in the said 260 and optionally the GPS position and the GPS position in the step 263. After the step 252, the time passes in the step 254 until the GPS receiver again awakens in the step 256 and so on.

In an alternative embodiment, the expected data bits in the chapter memory 50 may be updated through a radio signal when the GPS receiver 10 enters the operational mode. The methods of the present invention, referred to by various reference identifiers 100, 120, 150, 200 and 250 may in part or together be encoded or programmed onto a tangible medium in a form that is readable by a computer or by a microprocessor.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for determining global positioning system (GPS) clock time, comprising:
storing expected data bits for a prescribed block within a GPS-timed GPS message for a GPS signal source, said prescribed block having a length which is adjustable in order to accommodate an estimated accuracy of a coarse time estimate;
using said coarse time estimate for designating a single time-of-entry inside said prescribed block;
entering an operational mode at said time-of-entry for receiving a current chunk of data bits in a GPS signal from said GPS signal source; and
comparing said current data bit chunk with chunks of said expected data bits in said prescribed block for determining a GPS clock time.

2. The method of claim 1, wherein:
said block is GPS subframes one though three.

3. The method of claim 2, further comprising:
updating said block with said current data bits in said operation mode; and
returning to a standby mode when said block has been updated.

4. The method of claim 1, wherein:
said time-of-entry is about a mid-point of an expected arrival time of said block.

5. The method of claim 1, wherein:
determining said GPS clock time includes detecting a chunk of current data bits from said GPS signal; detecting a successful match between said chunk of said current data bits and one of a plurality of chunks of said expected data bits; and determining said GPS clock time from said expected data bit chunk having said successful match.

6. The method of claim 5, wherein:
detecting said successful match includes: comparing said current data bit chunk to said expected data bit chunks; detecting when said current data bit chunk matches one of said expected data bit chunks; and verifying that said current data bit chunk matches no more than one of said expected data bit chunks.

7. The method of claim 6, further comprising:
using said time estimate for computing time-variant expected data bits;
augmenting said stored expected data bits with said time-variant expected data bits for providing augmented expected data bits; and wherein:
using said augmented expected data bits for said expected data bit chunks for comparing said current data bit chunk to said expected data bit chunks.

8. The method of claim 6, wherein:
said current data bit chunk is compared to said expected data bit chunks within a search range within said block, said search range based on an estimated accuracy of said time estimate and an expected variation of a time length required for acquiring said GPS signal.

9. The method of claim 5, wherein:
detecting said successful match includes: comparing bits of said current data bit chunk to corresponding bits of said expected data bit chunks; noting signs of said bit comparisons; counting inversions between consecutive said signs for determining an inversion count; and determining said inversion count is not greater than a selected inversion limit.

10. The method of claim 9, wherein:
said inversion limit is two.

11. The method of claim 1, wherein:
said current chunk is shorter than said prescribed block.

12. The method of claim 1, wherein:
said prescribed block is continuous for bits of said expected data bits; and
said expected data bit chunks have bit-by-bit sequential starting bits in said prescribed block.

13. A global positioning system (GPS) receiver for determining GPS clock time, comprising:
a chapter memory configured to store expected data bits for a prescribed block within a GPS-timed GPS message for a GPS signal source, said prescribed block having a length which is adjustable in order to accommodate an estimated accuracy of a coarse time estimate;
a standby mode regulator configured to use said coarse time estimate to prescribe a single time-of-entry inside said prescribed block;
a signal processor configured to enter an operational mode at said time-of-entry to receive a current chunk of data bits in a GPS signal from said GPS signal source; and
a GPS time detector configured to compare said current data bit chunk with chunks of said expected data bits in said prescribed block to determine a GPS clock time.

14. The receiver of claim 13, wherein: said block is GPS subframes one though three.

15. The receiver of claim 14, further comprising:
a data update regulator for updating said block with said current data bits in said operation mode; and wherein:
the standby mode regulator returns directly to a standby mode when said block has been updated.

16. The receiver of claim 13, wherein:
said time-of-entry is about a mid-point of an expected arrival time of said block.

17. The receiver of claim 13, wherein:
the GPS signal processor processes said GPS signal in said operation mode for providing a chunk of current data bits; and
the GPS time detector compares said current data bit chunk to a plurality of chunks of said expected data bits and determines said GPS clock time when a successful match is detected between said current data bit chunk and one of said expected data bit chunks.

18. The method of claim 17, wherein:

the GPS time detector includes a chunk match detector for comparing said current data bit chunk to said chunks of said expected data bits and detecting when said current data bit chunk matches one of said expected data bit chunks; and a match limiter for verifying that said current data bit chunk matches no more than one of said expected data bit chunks.

19. The receiver of claim 18, wherein:

the GPS time detector includes a time-variant generator using said time estimate for computing time-variant expected data bits and augmenting said stored expected data bits with said time-variant expected data bits; and said chunk match detector uses said augmented expected data bits for said expected data bit chunks for comparing said current data bit chunk to said expected data bit chunks.

20. The receiver of claim 18, wherein:

said chunk match detector compares said current data bit chunk to said expected data bit chunks within a search range within said block, said search range based on an estimated accuracy of said time estimate and an expected variation of a time length required for acquiring said GPS signal.

21. The receiver of claim 17, wherein:

the GPS time detector includes a data bit comparator for comparing bits of said current data bit chunk to corresponding bits of one of said expected data bit chunks; a sign comparator for noting signs of said bit comparisons; a sign inversion counter for counting inversions between consecutive said signs for determining an inversion count; and an inversion counter limiter for determining said inversion count is not greater than a selected inversion limit.

22. The receiver of claim 21, wherein:

said inversion limit is two.

23. The receiver of claim 13, wherein:

said current chunk is shorter than said prescribed block.

24. The receiver of claim 13 wherein:

said prescribed block is continuous for bits of said expected data bits; and said expected data bit chunks have bit-by-bit sequential starting bits in said prescribed block.

* * * * *